United States Patent [19]

Yang et al.

[11] 4,333,747

[45] Jun. 8, 1982

[54] APPARATUS FOR RAPIDLY AND CONTINUOUSLY DEFOAMING LIQUID MATERIAL

[76] Inventors: Chiu H. Yang; Zuu C. Hong, both of 24 An Ching St., San Chung, Taipei, Taiwan

[21] Appl. No.: 190,336

[22] Filed: Sep. 24, 1980

[51] Int. Cl.³ .............................................. B01D 19/00
[52] U.S. Cl. ........................................ 55/178; 55/87; 55/191; 55/203; 210/218
[58] Field of Search ................ 55/36, 52, 55, 57, 87, 55/178, 191, 189, 207, 199, 203, 400; 210/218, 750, 767, 787

[56] References Cited

U.S. PATENT DOCUMENTS

| | | | |
|---|---|---|---|
| 2,046,904 | 7/1936 | Morgan | 55/178 |
| 2,648,496 | 8/1953 | Cresswell | 55/203 |
| 3,213,592 | 10/1965 | Rich | 55/178 |
| 3,407,569 | 10/1968 | Hendricks | 55/178 |
| 4,030,897 | 6/1977 | Pelzer et al. | 55/57 |

FOREIGN PATENT DOCUMENTS 2008971  6/1979  United Kingdom ................ 55/178

*Primary Examiner*—Benoit Castel
*Attorney, Agent, or Firm*—Armstrong, Nikaido, Marmelstein & Kubovcik

[57] ABSTRACT

The present invention relates to an apparatus for defoaming the thin-film of an adhesive fluid at low pressure and the apparatus thereof, which is characterized by utilizing a rotary vessel at low pressure (nearly vacuum) to separate bubbles from a viscous fluid by a centrifugation difference between the bubbles and fluid due to their different mass, and by creating a spiral flow path for the viscous fluid, to maximize the flow distance of the thin fluid flow within a limited space thereof.

3 Claims, 11 Drawing Figures

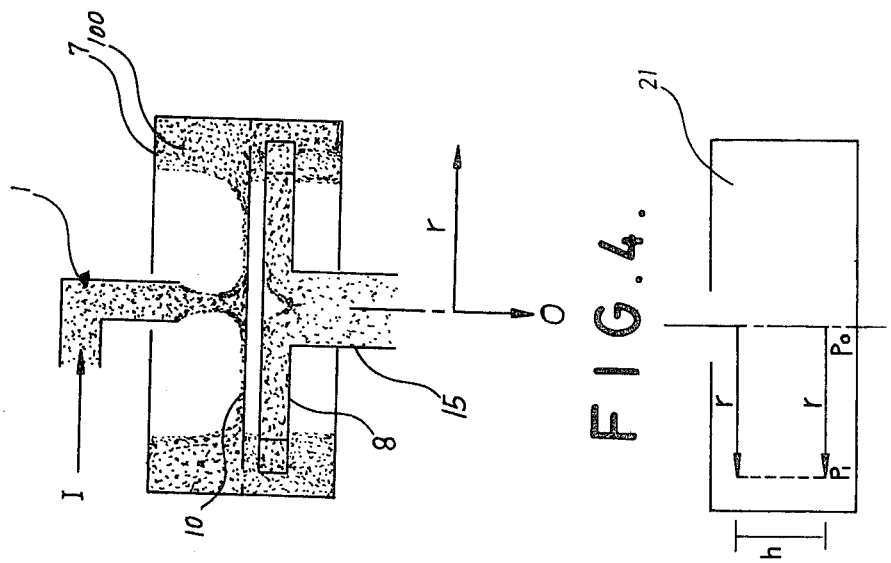
FIG. 4.
FIG. 5.
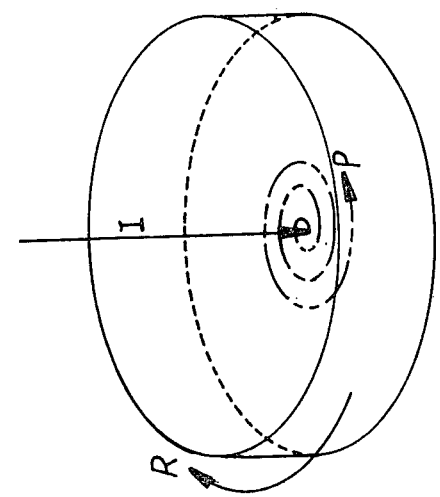
FIG. 3.
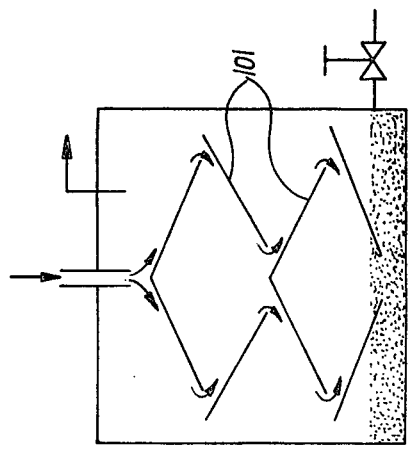
FIG. 1.
PRIOR ART
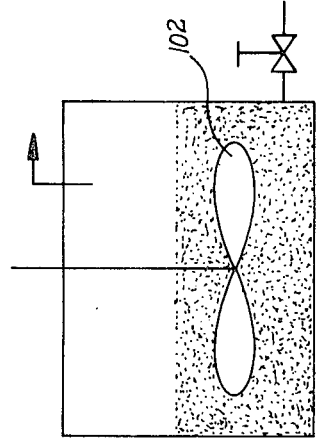
FIG. 2.
PRIOR ART

APPARATUS FOR RAPIDLY AND CONTINUOUSLY DEFOAMING LIQUID MATERIAL

BACKGROUND OF THE INVENTION

The present invention provides a defoaming apparatus for continuous operation and an apparatus characterized in a compact unit, a high-defoaming rate and an automatic feed and discharge. Particularly this invention provides outstanding effects in defoaming highly viscous fluids which contain bubbles.

The conventional methods for defoaming liquid material can be fairly divided into two types:

The first method is to subject the liquid material to form a thin-film viscous flow along the surface of a slanting plate and then flowing the same downward in the defoaming cylinder under a very low pressure (Shown in FIG. 1). The slanting plate (101) is set to increase the distance of flow path of fluid which enables the liquid material to flow stagnantly in a form of thin film and bubbles therein to expand and break off under a low pressure so that the objective of the present invention can be achieved. However, there are some disadvantages in such a defoaming method. One of the disadvantages is that they need a very bulky apparatus and also the flow rate of the liquid is very slow. Moreover, a thick liquid layer could easily be created due to an excess feed which would results in an undesirable effect in the defoaming treatment. Another disadvantage is that the machine operations such as air suction and the like must be stopped to take the material out of the apparatus when a considerable amount of the defoamed material has been accumulated at the bottom of the cylinder which causes inconvenience in the continuous operation. The second method makes use of a stirrer (Shown in FIG. 2). Material is charged in a closed vessel and stirred with a fan-shaped stirrer (102) under low pressure, which causes bubbles to expand and rise up to the surface of the liquid and flee away and therefore the purpose of defoaming is achieved. However, there are some disadvantages in such a method: the volume of said vessel is too large, the defoaming rate is too slow and the defoaming effect, usually, is not satisfactory; particularly, the defoaming effect can not be completed at the defiladed space where the stirring fan does not reach. Furthermore, bubbles may never break off even they have expanded when the fluids with high viscosity are stirred at the upper portion of said fan because the surface tension of the bubbles is sufficient to compete with the pressure difference between the inner and outer pressure of bubbles. This causes a soap foam like materials floating over the upper layer of the liquid. Accordingly, this method cannot provide a satisfactory defoaming results for highly viscous fluids.

SUMMARY OF THE INVENTION

The primary concept of the present invention resides in an easier defoaming method characterized in that: feed is charged into the central portion of a high speed rotating cylindrical vessel under a near vacuum pressure so that the fluids may creep from the central portion towards the outer margin of the rotary vessel in a spiral way (refer to FIG. 3), and a rotating effect along with the thin fluid flow that cause bubbles expanding under low pressure and rolling in the thin film spiral flow of the creeping fluid. Therefore, bubbles can be separated from the liquid material gradually. Since heavy liquid flows towards the outer margin of the vessel, bubbles expanding under the near vacuum (or low) pressure will be more easily separated from the liquid material.

The distribution of the liquid material in the rotating vessel is shown in FIG. 4. Pressure head at the vessel margin is estimated according to fluid dynamics:

$$P_1 - P_0 = \rho r^2 \omega^2 / 2,$$

wherein $P_1$ is the pressure at r distance (refer to FIG. 5) from the rotating center (i.e. the center of the vessel according to the present invention), $P_o$ is the pressure at the center region, $\rho$ is the density of liquid, r is the radius of the vessel, $\omega$ is the angular velocity.

In the above formula the factor of pressure $\rho gh$, formed from different height of liquid material near the margin region of the defoaming room (refer to 21 in FIG. 6) is not estimated since the defoaming room of the present invention is not high (refer to h in FIG. 5) and the density of liquid material is usually close to that of water, the contribution of the pressure $\rho gh$ (about 15 cm water column pressure) can be neglected as compared with the pressure head produced from the rotation of the vessel (about 3 atm) the details relating to the pressure head is described herein:

For an embodiment of the present invention wherein h=17.5 cm, $\rho=1$ g/cm$^3$, the rotation speed of vessel=1,200 rpm, the pressure head $P_1-P_0=2.5$ kg/cm$^2$ and $P_o \leq 20$ mm/Hg (due to the air suction in the defoaming chamber), the liquid pressure at the vessel margin is about 2.3~2.5 kg/cm$^2$ which is 1.3 to 1.5 atm pressure higher than that of the outer surrounding atmosphere. This pressure difference drives liquid material flowing through the small holes at the circumference of a partition board (bottom board of defoaming chamber) into a lower chamber therebelow. A S-shaped curve pipe is connected to a central discharge pipe at the vessel bottom to provide an automatic discharge.

The feed material can be transported through a feed pipe extended from the central portion of the vessel into a defoaming chamber and is driven by the atmospheric pressure outside the cylinder when the low pressure in the defoaming chamber is created due to the sucking of a vacuum pump. An additional control valve is set at the feed pipe to control the feeding rate.

BRIEF DESCRIPTION OF THE DRAWINGS

The figures described hereinafter are used to illustrate the apparatus of the present invention:

FIGS. 1 and 2 are schematic diagrams of the conventional types of the defoaming apparatus, FIG. 3 is a schematic diagram according to the present invention showing a spiral flow path of the liquid material after being charged into the central portion of the vessel, FIG. 4 is a schematic diagram showing the distribution of the liquid material in the rotary vessel, FIG. 5 illustrates each position of the symbol r, h, $P_1$ and $P_o$ in the defoaming chamber.

DETAILED DESCRIPTION OF THE PRESENTED EMBODIMENT

Referring to FIG. 3, the symbol I shows the direction of feed, R shows the rotation direction of cylindrical vessel and P the flow path of liquid material along the partition board of the cylindrical vessel. Referring to FIG. 4, I shows the direction of feed and O shows the direction of discharge, numeral 7 and 8 represent cylindrical vessel and S-shaped curve pipe respectively, and 10 is the partition board between upper and lower chambers of the cylindrical vessel 7. 15 is the discharge pipe and 100 represents liquid materials. Obviously, FIGS. 3 and 4 readily show the movement and distribution of the liquid material from feeding to discharging.

Figure 6:
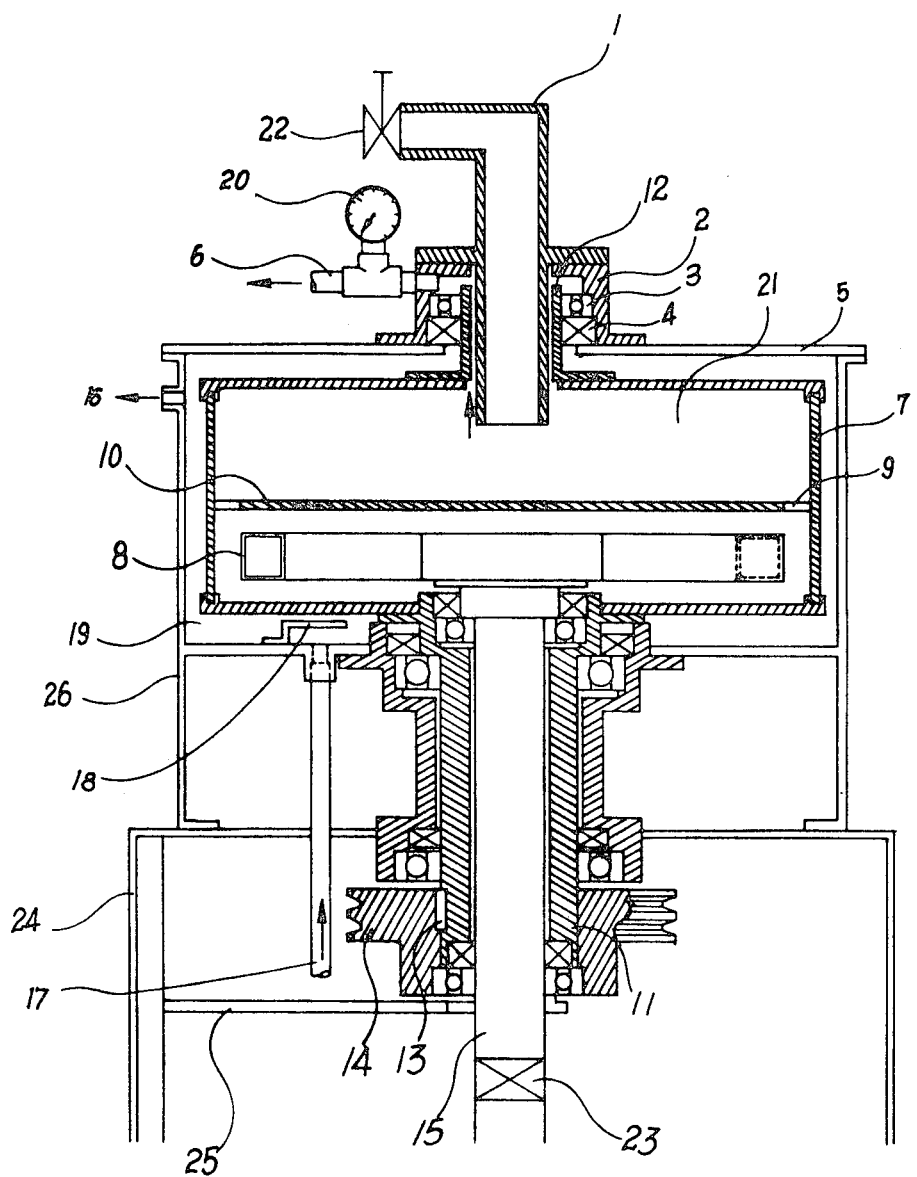
FIG. 6 is a cross-sectional view of the defoaming apparatus according to an embodiment of the invention.
Figure 7:
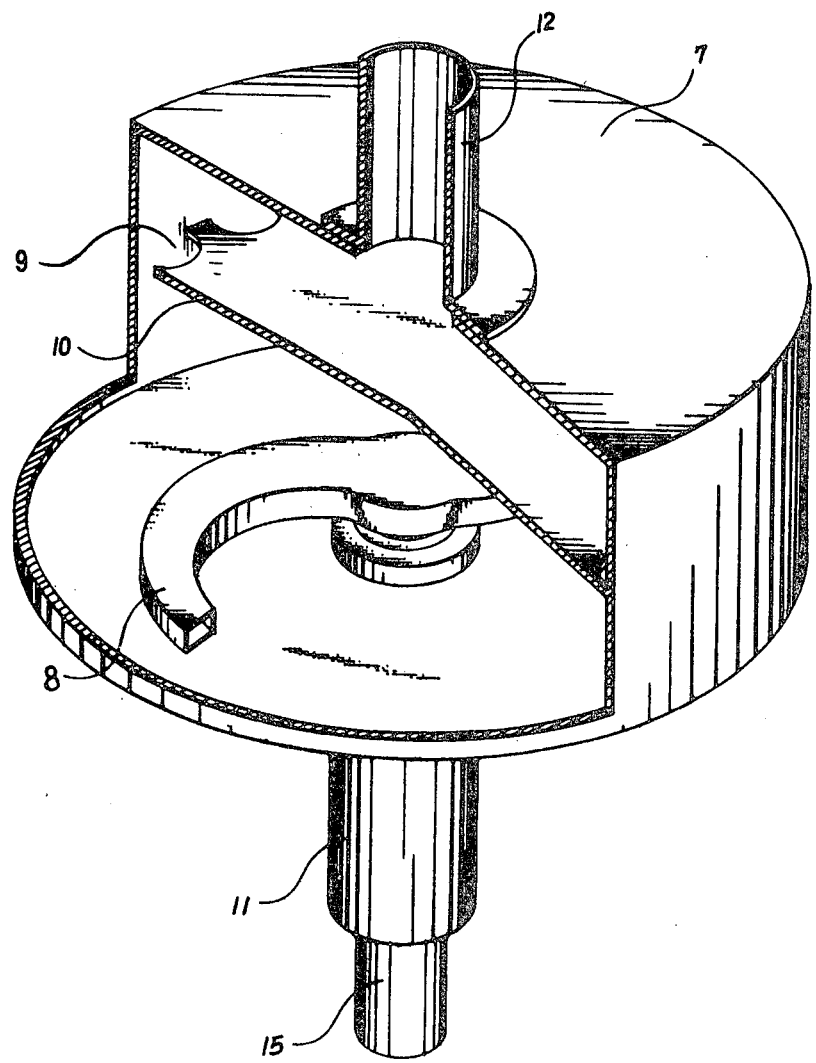
FIG. 7 is a perspective view of the main portion of the defoaming unit according to the present invention.
Figure 8:
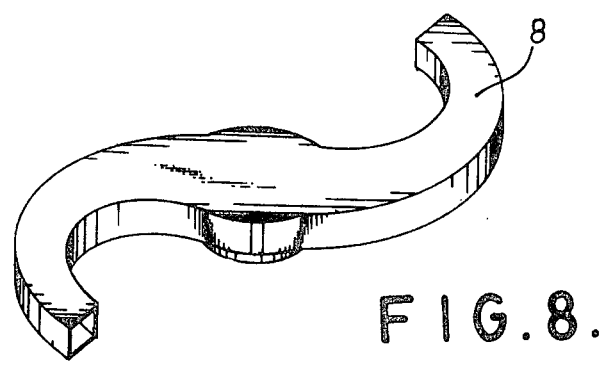
FIG. 8 is an outer view of the S-shaped curve pipe according to the present invention.
Figure 9:
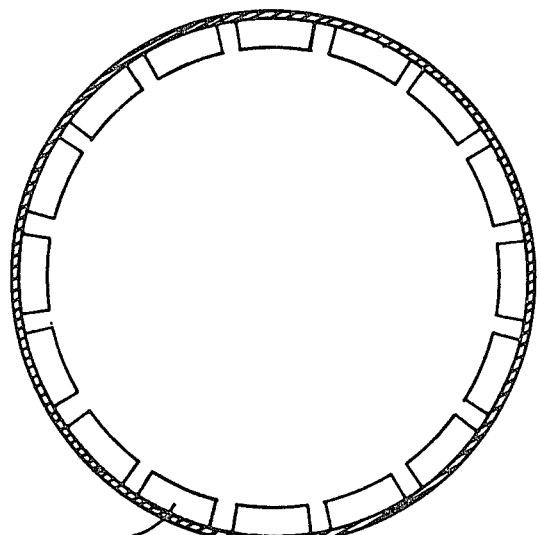
FIGS. 9 and 10 are the schematic diagrams illustrating the circumference of the partition board of the cylindrical vessel according to the present invention.
Figure 10:
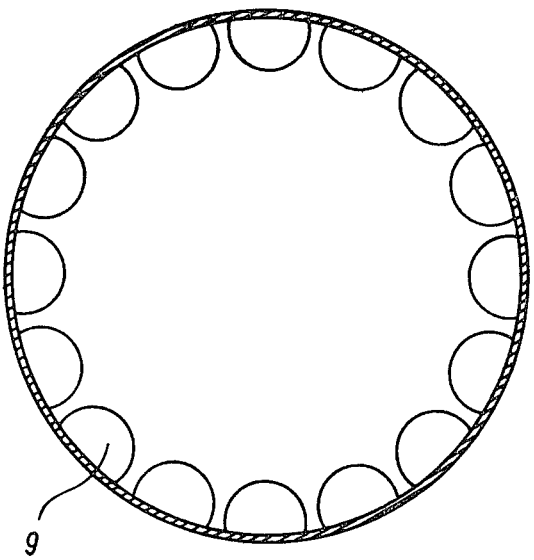

Referring to FIG. 6, liquid material is fed into the feed pipe (1) through a feed-control valve (22), and absorbed into the defoaming chamber (21) of cylindrical vessel (7) and then passed to the central portion of partition board (10). Since cylindrical vessel (7), upper sleeve (12) and lower sleeve (11) are connected together as a whole body by screws, and lower sleeve (11) is fixed on a belt pulley (14) with a pin (13) wherein said belt pulley (14) is connected with a motor, the cylindrical vessel (7), lower sleeve (11), upper sleeve (12), pin (13) and belt pulley (14) are rotated together while the operation is proceeding. A S-shaped curve pipe (8) is connected with discharge pipe (15) and is kept fixed without rotation. After the materials have crept towards the outer margin of defoaming chamber (21) due to the rotation of cylindrical vessel (7), the pressure head of material at the position close to said margin is about 2.3 to 2.5 kg/cm². This pressure head drives the material to pass through small holes (9) at the margin of partition board (10) into margin region of the lower chamber of cylindrical vessel (7). This material is discharged through said S-shaped curve pipe (8) which has openings under said small holes (9) and is connected with outside space (pressure: 1 atm). Finally, material passed the small holes (9) is automatically discharged due to the pressure difference between the pressures of inside and outside vessel. A check valve (23) is also fixed at the opening of discharge pipe (15). The check valve (23) is in a closed state at the beginnings of the operation, thus, enabling the pressure within the defoaming chamber to be smoothly sucked to a near vacuum pressure so that the liquid material can be absorbed into the defoaming chamber automatically. While the air is sucked, the air flow path is through the pipe (6), a vacuum pump and a vacuum pressure gauge (20), which enables air to be sucked from the defoaming chamber upwards through the small space between feed pipe (1) and upper sleeve (12) and finally into pipe 6.

The perspective view and the operating embodiment of the cylindrical vessel (7), partition board (10), small holes (9), S-shaped curve pipe (8), upper sleeve (12), lower sleeve (11) and discharge pipe (15) are illustrated in FIGS. 7, 8, 9 and 10. As shown in FIG. 6 feed pipe (1) is fixed together with shaft bearing set (2), upper cover (5) of outer cylinder (26), outer cylinder (26) and machine body stand (24), wherein said machine body stand (24) is connected by a fixed bar (25) to discharge pipe (15) in order to fix the discharge pipe. The clearances between upper, lower sleeves (12) (11) and their respective shaft bearing set (2), and the clearance between lower sleeve (11) and discharge pipe (15) are properly sealed with bearings (3) and seals (4).

As a result of the rotation of material in the cylindrical vessel (7), friction heat is caused due to the viscous effect of the fluid flow. In order to protect the machine body and prevent a temperature increase in the discharged material, an outer cylinder (26) is fixed outside the vessel (7) to form a cooling chamber (19) in which cooling water (normally city water will work) is charged from an inlet (17) into the lower portion of the cooling chamber (19). A curve piece (18) is fixed below the cooling chamber to force cooling water feeding towards the rotation center. Cooling water is charged into the outer cylinder (26) by centrifugation effects due to the rotation of cylindrical vessel (7), then discharged through a discharge pipe at the outlet (16) at the upper portion of the outer cylinder (26). The above mentioned embodiment can be carried out by utilizing a cylindrical vessel, for example, having a diameter of 350 mm of the defoaming chamber (21) with a height of 40 mm, and having a lower chamber with a height of 40 mm, applying to defoam a viscous chemical material of DFM (about $1.2 \times 10^4$ cps). From our test run, the defoaming speed was 5 liters/min. for a conventional apparatus having a capacity of 50 liters, it takes 2.5 hr (i.e. 0.133 l/min) to defoam 20 l. materials by means of stirring. Obviously, the present invention provides an outstanding defoaming ability (30 times of the conventional way).

Furthermore, the present invention provides another outstanding advantage that the operation of the present apparatus needs unnecessarily to be raised up to a considerable height above the ground, because the rotation of cylindrical vessel provides a pressure head to the liquid materials at the margin region so as to discharge materials automatically and rapidly while the conventional apparatus must be raised up 30 meters above the ground to let the materials flow downwards by gravity force.

Figure 11:
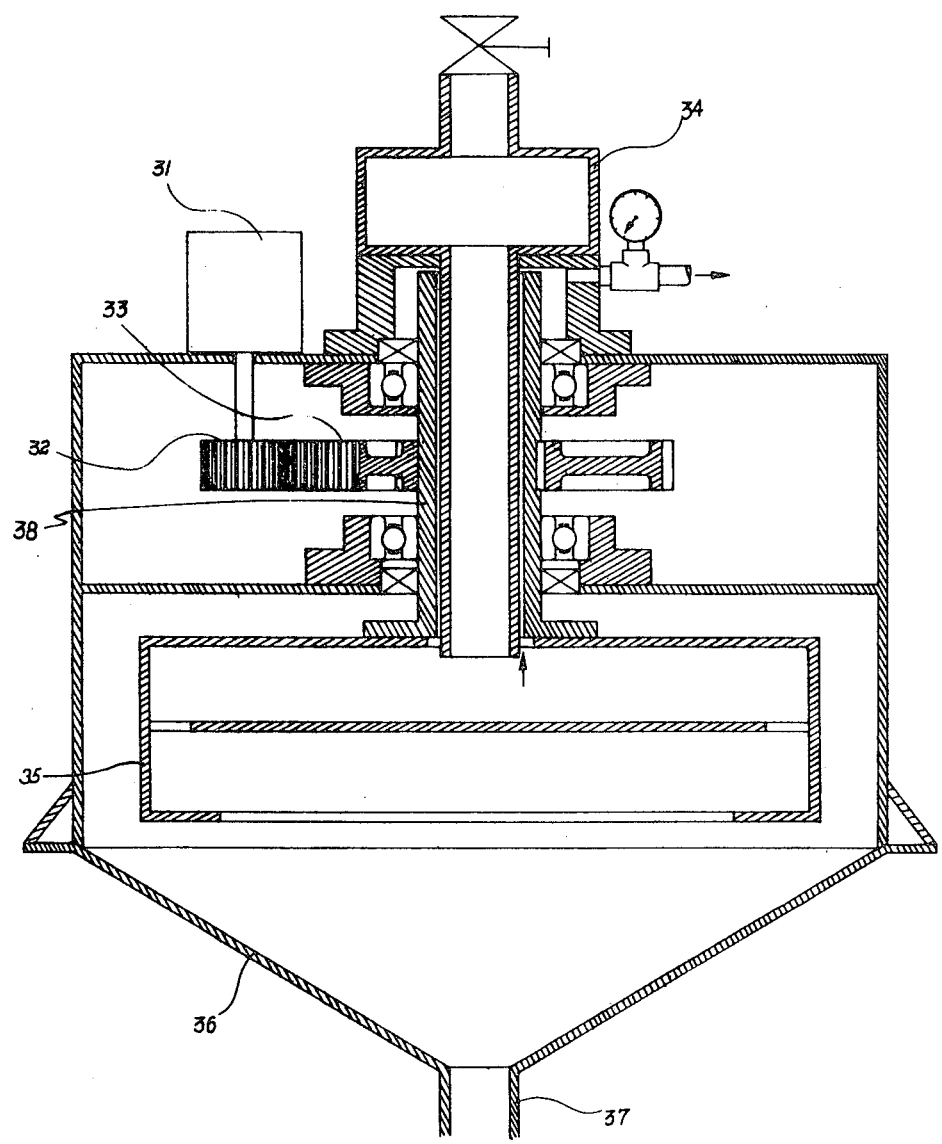
FIG. 11 is a cross-sectional view of the defoaming apparatus according to another embodiment of the invention.

Referring to FIG. 11, another embodiment of the present invention is illustrated hereinafter:

The material defoamed is passed through a funnel-shaped cylinder (36) below the cylindrical vessel (35) to the discharge pipe (37). However, this defoaming apparatus must be raised up to a height of 10 meters above the ground so as to maintain a continuous operation for the automatic discharging. If the height is lower than 10 meters, a pump must be employed at the discharge outlet so that a continuous defoaming process can be obtained. The advantages of this embodiment are that the S-shaped curve pipe lower sleeve, and their related parts can be omitted and that friction heat caused by viscosity effects between the rotating liquid material and the fixed S-shaped curve pipe can be avoided. Accordingly, the cooling system could also be eliminated in the apparatus of this embodiment. In order to match with the operation of the funnel-shaped cylinder (36), the bottom of the cylindrical vessel (35) is designed to be hollow except for the portion near its margin. In addition, a motor (31), motor gear (32) and speed-reducing gears (33) are provided for the apparatus in this embodiment so as to drive the rotation of outer sleeve

(38) and disk vessel (35), instead of belt and belt pulley driving means.

We claim:

1. An apparatus for defoaming a liquid containing a gas comprising:

a cylindrical vessel having a top, a bottom, an interior and an axis;

a partition board longitudinally dividing the interior of the vessel into an upper chamber and a lower chamber, said partition board having a plurality of small holes at the circumferential periphery thereof communicating the upper chamber with the lower chamber;

a casing surrounding the vessel;

a first sleeve axially connected to the top of the vessel rotatably mounting the vessel in the casing;

a liquid feed pipe stationarily mounted in the first sleeve having an annular clearance between the first sleeve and the feed pipe, the feed pipe opening into the upper chamber;

means for rotating the vessel in the casing operatively associated with the first sleeve;

means for creating a partial vacuum in the vessel connected to the interior of the vessel via said clearance; and means for discharging defoamed liquid opening into the lower chamber comprising a second sleeve rotatably, axially connected to the bottom of the vessel, a discharge stationarily mounted in the second sleeve and a pair of pipes which are S-shaped in plan view fixedly mounted in the lower chamber on said discharge pipe, said S-shaped pipes each having a scoop opening at its end furthest from the axis of the vessel.

2. An apparatus for defoaming a liquid containing a gas comprising:

a cylindrical vessel having a top, a bottom, an interior and an axis;

a partition board longitudinally dividing the interior of the vessel into an upper chamber and a lower chamber, said partition board having a plurality of small holes at the circumferential periphery thereof communicating the upper chamber with the lower chamber;

a casing surrounding the vessel;

a first sleeve axially connected to the top of the vessel rotatably mounting the vessel in the casing;

a liquid feed pipe stationarily mounted in the first sleeve having an annular clearance between the first sleeve and the feed pipe, the feed pipe opening into the upper chamber;

means for rotating the vessel in the casing operatively associated with the first sleeve;

means for creating a partial vacuum in the vessel connected to the interior of the vessel via said clearance; and means for discharging defoamed liquid opening into the lower chamber comprising a funnel-shaped bottom to said casing having an apex and a discharge pipe at the apex; and wherein the bottom of the vessel is hollow except for a portion near its margin.

3. The apparatus according to claim 1 or 2 further comprising inlet means and outlet means connected to the casing for supplying a cooling medium between the casing and the vessel.

* * * * *